US012564807B2

(12) United States Patent
Asafu-Adjaye et al.

(10) Patent No.: US 12,564,807 B2
(45) Date of Patent: Mar. 3, 2026

(54) DEWATERING VISCOUS LIQUIDS WITH PRESSURIZED CARBON DIOXIDE

(71) Applicant: Auburn University, Auburn, AL (US)

(72) Inventors: Osei Asafu-Adjaye, Auburn, AL (US); Brian Via, Opelika, AL (US); Bhima Sastri, North Potomac, MD (US); Sujit Banerjee, Marietta, GA (US)

(73) Assignee: AUBURN UNIVERSITY, Auburn, AL (US)

( * ) Notice: Subject to any disclaimer, the term of this patent is extended or adjusted under 35 U.S.C. 154(b) by 761 days.

(21) Appl. No.: 17/954,820

(22) Filed: Sep. 28, 2022

(65) Prior Publication Data
US 2023/0115487 A1 Apr. 13, 2023

Related U.S. Application Data

(60) Provisional application No. 63/249,847, filed on Sep. 29, 2021.

(51) Int. Cl.
| | |
|---|---|
| *B01D 43/00* | (2006.01) |
| *B01J 20/26* | (2006.01) |
| *B01J 20/34* | (2006.01) |
| *C13B 25/00* | (2011.01) |
| *D21C 11/00* | (2006.01) |

(52) U.S. Cl.
CPC ............ *B01D 43/00* (2013.01); *B01J 20/261* (2013.01); *B01J 20/3425* (2013.01); *B01J 20/345* (2013.01); *C13B 25/00* (2013.01); *D21C 11/0007* (2013.01); *D21C 11/0042* (2013.01)

(58) Field of Classification Search
CPC ..... B01D 43/00; B01J 20/261; B01J 20/3425; B01J 20/345; C13B 25/00; C13B 15/00; C13B 10/14; C13B 20/06; D21C 11/0007; D21C 11/0042; D21C 9/00; D21C 9/18
USPC ....... 502/34, 56; 210/767, 771; 34/402, 443; 554/8, 9; 530/205, 500; 127/46.1, 49; 203/49; 162/39–43, 63
See application file for complete search history.

(56) References Cited

U.S. PATENT DOCUMENTS

| | | | | |
|---|---|---|---|---|
| 4,992,308 | A * | 2/1991 | Sunol | B27K 5/007 |
| | | | | 427/325 |
| 7,157,002 | B2 * | 1/2007 | Nagai | B01D 19/0068 |
| | | | | 257/E21.255 |
| 8,486,224 | B2 | 7/2013 | Ohman et al. | |
| 9,382,389 | B2 | 7/2016 | Ohman et al. | |
| 9,637,765 | B2 | 5/2017 | Luterbacher et al. | |
| 9,777,033 | B2 | 10/2017 | Ohman et al. | |
| 10,166,491 | B2 | 1/2019 | Kinney et al. | |
| 2007/0225514 | A1 | 9/2007 | Davis et al. | |
| 2012/0291774 | A1 * | 11/2012 | Kilambi | D21C 3/22 |
| | | | | 127/44 |

FOREIGN PATENT DOCUMENTS

| | | | | |
|---|---|---|---|---|
| CA | 2945277 | C | 1/2021 | |
| EP | 2876203 | A1 * | 5/2015 | ............. D21H 25/02 |
| JP | H08183989 | A * | 7/1996 | ............... A23F 5/48 |
| JP | H09276900 | A * | 10/1997 | ............... C02F 1/74 |
| JP | 2004162683 | A * | 6/2004 | ............... B01J 3/00 |
| KR | 20200145178 | A * | 12/2020 | ............ C02F 11/143 |
| KR | 20210092935 | A * | 7/2021 | ............ C02F 11/143 |
| WO | WO-2005122776 | A1 * | 12/2005 | ............. A23B 4/033 |
| WO | WO-2008091163 | A1 * | 7/2008 | ............. F26B 21/06 |

OTHER PUBLICATIONS

Asafu-Adjaye, Via, B., Sastri B., Banerjee, S. Displacement dewatering of sludge with supercritical CO2. Water Res. 190, 116764, 2021a.

Asafu-Adjaye, Via, B., Sastri, B., Banerjee, S., Mechanism of dewatering porous structures with supercritical carbon dioxide. Case Stud. Chem. Environ. Eng., 4, 100128, 2021b.

Aggarwal, S., Johnson, S., Hakovirta, M., Sastri, B., Banerjee, S. Removal of water and extractives from softwood with supercritical carbon dioxide. Ind. Eng. Chem. Res. 58, 3170-3174, 2019.

Banerjee, S., Sastri, B., Aggarwal, S., Hakovirta, M. Dewatering coal with supercritical carbon dioxide. Int. J. Coal Prep. Util. 42(5), 1393 (2020).

Bispo, J.A.C., Bonafe, C.F.S., Santana, K.M.O.V., Santos, E.C.A. A comparison of drying kinetics based on the degree of hydration and moisture ratio. Food Sci. Technol. 60, 192-198, 2015.

Clay D.T. Evaporator principles and black liquor properties. https://www.tappi.org/content/events/08kros/manuscripts/3-1.pdf.

Durruty J. On the local filtration properties of LignoBoost lignin. PhD dissertation. Chalmers University of Technology, Gothenburg, Sweden. 2017.

Franich, R.A., Gallagher, S., Kroese, H. Dewatering green sapwood using carbon dioxide cycled between supercritical fluid and gas phase. J. Supercrit. Fluids 89, 113-118, 2014.

Franich, R.A, Meder, R., Falge, M., Fuchs, J., Behr, V.C. Uncovering supercritical CO2 wood dewatering via interleaved 1H-imaging and 13C-spectroscopy with real-time reconstruction. J. Supercrit. Fluids. 144, 56-62, 2019.

(Continued)

*Primary Examiner* — Patricia L. Hailey
(74) *Attorney, Agent, or Firm* — Joseph T. Leone; Yanjun Ma; DeWitt LLP

(57) ABSTRACT

Methods of dewatering viscous materials are provided. The method comprises contacting the viscous material with pressurized carbon dioxide at a temperature and for a time wherein at least a fraction of water is expressed from the viscous material. Then the pressure is released, and the water expressed from the viscous material is removed to yield a dewatered product. Exemplary viscous materials that can be dewatered by the method include black liquor from wood pulping operations, wet lignin, wet super water absorbent polymers and sugar solutions. The pressurized carbon dioxide is present in subcritical or supercritical form. The method provides dewatering at reduced cost.

23 Claims, 6 Drawing Sheets

(56) References Cited

OTHER PUBLICATIONS

Kienberger, M., Maitz, S., Pichler, T., Demmelmayer, P. Systematic review on isolation processes for technical lignin. Processes 2021, 9(5), 804.

Montesantos, N., Nielsen, R.P., Maschietti, M. Upgrading of nondewatered nondemetallized lignocellulosic biocrude from hydrothermal liquefaction using supercritical carbon dioxide. Ind. Eng. Chem. Res. 59, 6141-6153, 2020.

Sewring T, Durruty J, Schneider L, Schneider H, Mattsson T, Theliander H. Acid precipitation of kraft lignin from aqueous solutions: the influence of pH, temperature, and xylan. J Wood Chem Technol 3, 1-13, 2019.

Swindells, J.F., Snyder, C.F., Hardy, R.C., Golden, P.E., Viscosities of sucrose solutions at various temperatures: Tables of recalculated values. Supplement to National Bureau of Standards Circular 440 Issued Jul. 31, 1958.

Tomani, P., The Lignoboost process. Cellulose Chem. Technol., 44 (1-3), 53-58, 2010.

Wu, C.C., Raghavan S., Pine, A., Alfaro, J, Love, B .J., Collias, D.I. Dewatering of super absorbent polymers: Alternatives to thermal desorption by liquid phase extraction using dimethyl ether. Resour Conserv Recycl. 171. 2021.

Zekry, M., Nassar, I., Salim, H., Abdallah, A. The potential of super absorbent polymers from diaper wastes to enhance water retention properties of the soil. Soil Environ. 39(1): 27-37, 2020.

Brown, Z.K., Fryer, P.J., Norton, I.T., Bakalis, S., Bridson, R.H. Drying of foods using supercritical carbon dioxide-investigations with carrot. Innov. Food Sci. Emerg. Technol. 9, 280-289, 2018.

* cited by examiner

DEWATERING VISCOUS LIQUIDS WITH PRESSURIZED CARBON DIOXIDE

CROSS-REFERENCE TO RELATED APPLICATIONS

Priority is hereby claimed to provisional application Ser. No. 63/249,847, filed Sep. 29, 2021, which is incorporated herein by reference.

STATEMENT REGARDING FEDERALLY SPONSORED RESEARCH & DEVELOPMENT

This invention was made with government support under DE-FE0022594 awarded by the Department of Energy. The government has certain rights in the invention.

BACKGROUND

Dewatering porous matrices is a major industrial operation, central to processing materials ranging from sludge to food. Mechanical dewatering is the least expensive option (with presses and centrifuges as examples), but it is only able to remove free water, which is usually a fraction of the water present. Thermal dryers are commonly used to achieve higher dryness, but at high energy and environmental cost. Also, they cannot be applied to thermally sensitive products. Vacuum drying and freeze-drying are other options, but they are slow and expensive.

Carbon dioxide is considered to be supercritical at a temperature at or above 31° C. and at a pressure at or above 1,070 psi. The use of supercritical carbon dioxide, referred to hereafter as $sCO_2$, to remove water from porous matrices such as wood, coal and sludge has been disclosed. Franich et al. (2014, 2019) taught the removal of water from green *radiata* pine sapwood by $sCO_2$. Aggarwal et al. (2019) discovered that the water removed from wood by $sCO_2$ far exceeded its solubility in $sCO_2$, indicating that the water was physically displaced by the $sCO_2$ in addition to being dissolved out. It has also been reported that water can be similarly displaced from sludge (Asafu-Adjaye et al., 2021a) and coal (Banerjee et al., 2020). The mechanism of the process has been described by Asafu-Adjaye et al. (2021b) and is believed to involve viscous fingering whereby the water held in pores in the matrix to be dewatered is physically displaced by $sCO_2$. Hence, for this process to be operable, the matrix must have a defined porous structure. The present disclosure reveals an unexpected and very useful finding whereby certain viscous materials that lack an intrinsic porous structure can also be dewatered by $sCO_2$. Methods of dewatering viscous materials using pressurized carbon dioxide are disclosed herein.

SUMMARY

Disclosed herein is a method of dewatering viscous materials using pressurized carbon dioxide. The method comprises contacting the viscous material with pressurized carbon dioxide at a temperature and for a time wherein at least a fraction of water is expressed from the viscous material. Then the pressure is released, and the water expressed from the viscous material is removed to yield a dewatered product. The efficacy of the method in dewatering viscous materials is demonstrated in the present disclosure. Because water in the viscous material is physically displaced by the pressurized carbon dioxide in addition to being dissolved out, the fraction of water removed from the viscous materials exceeds the solubility of water in the pressurized carbon dioxide.

The viscous material typically has a viscosity of between about 2 and about 30,000 centipoise. Solid content of the viscous material can be between about 0.01% and about 95%, and in some embodiments between about 10% and about 95%. Examples of the viscous material include black liquor from a wood pulping operation (e.g., softwood black liquor and hardwood black liquor), wet lignin, mixture of a superabsorbent polymer (e.g., sodium polyacrylate) and water, and mixture of a carbohydrate (e.g., sugar) and water.

In preferred embodiments, the viscous material is contacted with the pressurized carbon dioxide for between about 10 milliseconds and about 3 hours.

The pressurized carbon dioxide is present in supercritical or subcritical form. Preferably, the temperature of the carbon dioxide is between about 31° C. and about 200° C. Preferably, the pressure of the carbon dioxide is between about 1,080 psi and about 4,000 psi.

In some versions, the carbon dioxide interacts with components of the viscous material to increase solid content of the material, wherein the viscous material is black liquor from a wood pulping operation or wet lignin.

The objects and advantages of the disclosure will appear more fully from the following detailed description of the preferred embodiment of the disclosure made in conjunction with the accompanying drawings.

DETAILED DESCRIPTION

Figure 1:
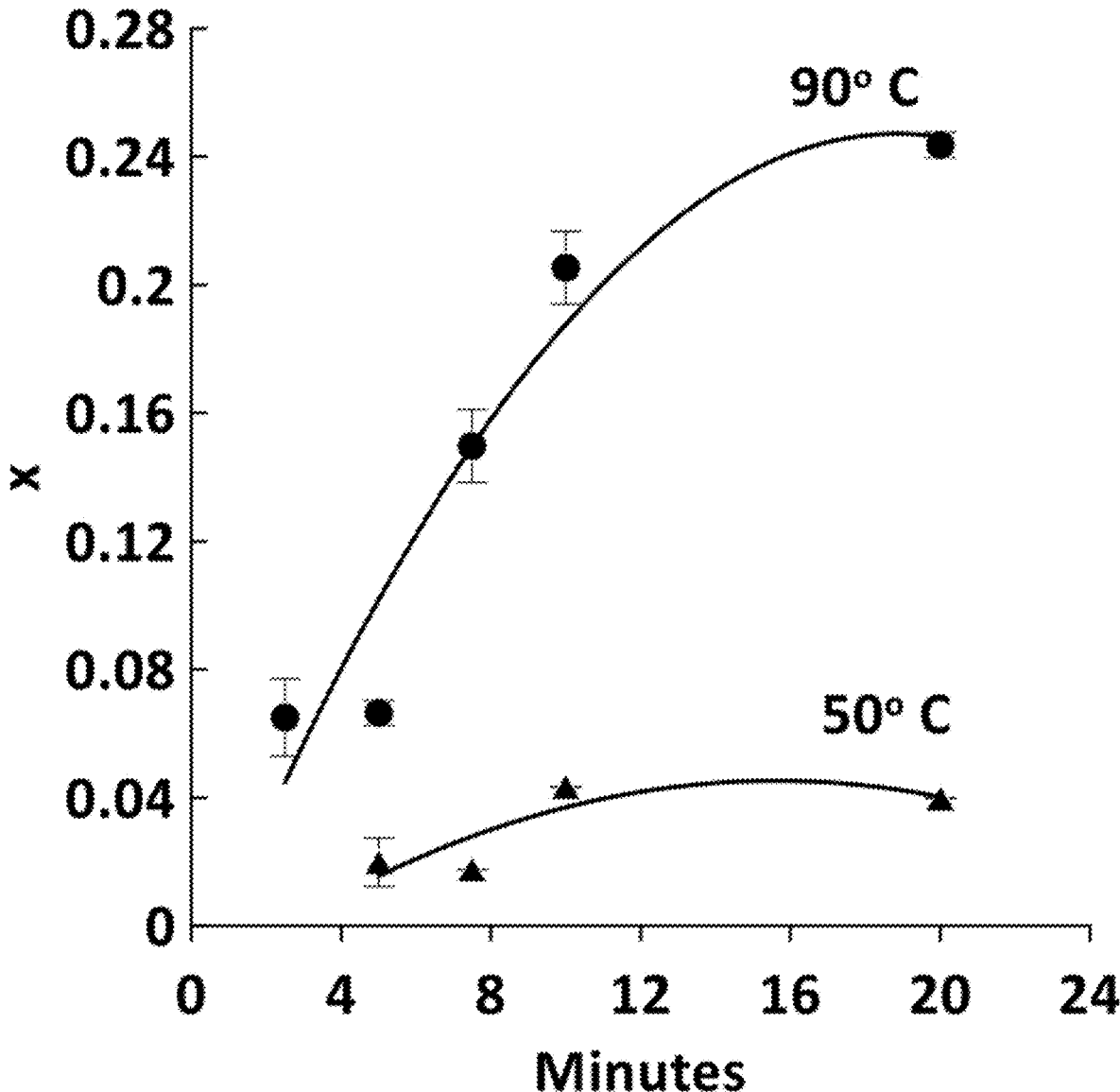
FIG. 1. Dewatering of black liquor (dry moisture content of 61-74%) by $sCO_2$ at 1,203 psi.

Methods of dewatering viscous materials are provided herein according to the present disclosure. The method comprises contacting the viscous material with pressurized carbon dioxide ($CO_2$) at a temperature and for a time wherein at least a fraction of water is expressed from the viscous material. Then the pressure is released to void the $CO_2$ and the water expressed from the starting material, and partially or completely dewatered product is recovered.

A viscous material lacks an intrinsic porous structure. As used herein, the term "viscous material" or "viscous liquid" refers to a material with a viscosity greater than that of water. At 20° C., water has a viscosity of 1 centipoise (cP). In some embodiments, the viscous material has a viscosity of between about 2 and about 30,000 cP. The viscous material can have a solid content between about 0.01% and about 95%, and in some embodiments between about 10% and about 95%. Viscous materials that are suitable for dewatering by the method disclosed herein are not limited to the examples of the present disclosure.

An example of a viscous material lacking an intrinsic porous structure is black liquor, which is the residue remaining from pulping wood for papermaking. It is used as fuel to power the mill. It is principally composed of lignin, and it also contains extractives, carbohydrate derivatives and inorganic salts. As currently practiced, the liquor is concentrated from about 15% to over 65% solids in multiple-effect evaporators prior to combustion. The evaporators are the largest consumers of steam in a pulp mill. The viscosity of black liquor ranges from 1 cP to over 90 cP (Clay; Evaporation Principles and Black Liquor Properties). The method disclosed herein displaces the water from the black liquor with pressurized $CO_2$ instead of removing the water through evaporation, thereby avoiding the cost of evaporation.

Another example of a viscous material suitable for dewatering by pressurized $CO_2$ is homogenous wet lignin. Lignin can be isolated from black liquor or from biorefinery operations for use as a biofuel in other industries, e.g., through the "Lignoboost" process disclosed by Tomani (2010). Black liquor is acidified to precipitate the lignin, which is then partially separated from the water with a press (Ohman et al., U.S. Pat. No. 9,777,033). The pressed cake has a solids level of 70% (Ohman et al., U.S. Pat. No. 8,486,224), and further drying requires superheated steam (Ohman et al., U.S. Pat. No. 9,382,389) or heated air. The isolated lignin must be washed to remove undesirable black liquor components and then dried. Drying is currently done thermally with the expenditure of considerable energy. The method disclosed herein simultaneously deposits the lignin into a wet porous solid matrix and then dewaters the matrix non-evaporatively, thereby saving the energy of evaporation.

Yet another example of a viscous material suitable for dewatering by pressurized $CO_2$ is sodium polyacrylate (Na-PA), a representative superabsorbent polymer that can absorb water that is several hundred times of its own weight. The Na-PA structure is collapsed when dry but expands in the presence of water to form a gel. Na-PA dewatering has been attempted with heat (Zekry et al., 2020) or organic solvents (Wu et al., 2021). Both procedures are energy intensive or have environmental disbenefits. The method disclosed herein dewaters the matrix non-evaporatively, thereby saving the energy of evaporation. Also, it does not require the use of solvents.

The method can also be used to dewater solutions of sugar. Industrial manufacture of sugar involves vacuum evaporation of the raw juice from 15-65% solids in multiple effect evaporators and vacuum evaporation until crystallization occurs. Pressurized $CO_2$ dewatering occurs at sub-boiling temperatures thereby conserving the heat of evaporation.

The viscous material of the present disclosure also includes semi solids such as algal beds.

The pressurized $CO_2$ used in the method can be present in supercritical or subcritical form. $CO_2$ is considered to be supercritical at a temperature at or above 31° C. and at a pressure at or above 1,070 psi. At lower temperature and/or lower pressure, $CO_2$ is in subcritical form.

In various versions, the pressure of the pressurized $CO_2$ is preferably between about 900 psi and about 4,000 psi, and more preferably, between about 1,080 psi and about 4,000 psi. Exemplary pressures of the pressurized $CO_2$ include about 900 psi, about 950 psi, about 990 psi, about 1000 psi, about 1080 psi, about 1100 psi, about 1200 psi, about 1203 psi, about 1300 psi, about 1400 psi, about 1500 psi, about 1600 psi, about 1700 psi, about 1800 psi, about 1900 psi, about 2000 psi, about 2100 psi, about 2200 psi, about 2300 psi, about 2400 psi, about 2500 psi, about 2600 psi, about 2700 psi, about 2800 psi, about 2900 psi, about 3000 psi, about 3100 psi, about 3200 psi, about 3300 psi, about 3400 psi, about 3500 psi, about 3600 psi, about 3700 psi, about 3800 psi, about 3900 psi, about 4000 psi, or any range between any of the forgoing values.

In various versions, the temperature of the pressurized $CO_2$ is preferably between about 31° C. and about 200° C. Exemplary temperatures of the $CO_2$ include about 31° C., about 35° C. about 40° C., about 45° C., about 50° C., about 55° C., about 60° C., about 65° C., about 70° C., about 75° C., about 80° C., about 85° C., about 90° C., about 95° C., about 100° C., about 105° C., about 110° C., about 115° C., about 120° C., about 125° C., about 130° C., about 135° C., about 140° C., about 145° C., about 150° C., about 155° C., about 160° C., about 165° C., about 170° C., about 175° C., about 180° C., about 185° C., about 190° C., about 195° C., about 200° C., or any range between any of the forgoing values.

In various versions, the viscous material is preferably contacted with the pressurized $CO_2$ for a time between about 10 milliseconds and about 3 hours. Exemplary contacting times include about 10 milliseconds, about 1 second, about 30 seconds, about 1 minute, about 2.5 minutes, about 5 minutes, about 7.5 minutes, about 10 minutes, about 15 minutes, about 20 minutes, about 25 minutes, about 30 minutes, about 35 minutes, about 40 minutes, about 45 minutes, about 50 minutes, about 55 minutes, about 1 hour, about 1.5 hours, about 2 hours, about 2.5 hours, about 3 hours, or any range between any of the forgoing values.

It is to be understood that a person of ordinary skill in the art may further optimize the pressure, temperature and contacting time based on the characteristics of the viscous material within or outside the ranges disclosed herein. After one dewatering process, the $CO_2$ can be recovered for reuse using methods known in the art, e.g., Asafu-Adjaye et al., 2021a.

The method disclosed herein is advantageous over current methods of dewatering viscous materials in that the method does not require the use of solvent or evaporation of water at the cost of the energy of evaporation. Because water in the viscous material is physically displaced by the pressurized $CO_2$ in addition to being dissolved out, the amount of water removed exceeds the solubility of water in the pressurized $CO_2$.

In certain versions, $CO_2$ interacts with components of the viscous material to increase the solid content. For example, contacting $CO_2$ with black liquor or wet lignin deposits the lignin component from the material and forms a cage from which water can be expressed. In this process, a porous structure is firstly induced by the pressurized $CO_2$ and the material is subsequently dewatered by the pressurized $CO_2$, with the amount of water removed exceeding the solubility of water in the pressurized $CO_2$.

As used herein, the term "about" refers to +10% of the variable referenced.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

As used herein, the singular forms "a," "an," and "the" include plural referents unless the content clearly dictates otherwise.

As used herein, the term "or" is an inclusive "or" operator and is equivalent to the term "and/or" unless the context clearly dictates otherwise.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

The elements and method steps described herein can be used in any combination whether explicitly described or not, unless otherwise specified or clearly implied to the contrary by the context in which the referenced combination is made.

All combinations of method steps as used herein can be performed in any order, unless otherwise specified or clearly implied to the contrary by the context in which the referenced combination is made.

The system disclosed herein my comprise, consist of, or consist essentially of the various steps and equipment disclosed herein.

It is understood that the disclosure is not confined to the particular elements and method steps herein illustrated and described, but embraces such modified forms thereof as come within the scope of the claims.

EXAMPLES

Example 1

Typical results from dewatering black liquor are illustrated in FIG. 1. The black liquor was contacted with $sCO_2$ in an OCO Labs Super C unit. The term x represents the nominal (both dissolved and entrained) mole fraction concentration of water in the bulk $sCO_2$ under the conditions used. This value reflects the water removed from the black liquor. The range of x is broadly consistent with those obtained with porous matrices such as sludge, wood, and coal, where the dewatering efficiency was mainly sensitive to temperature and much less so to pressure. An increase in temperature improved extraction efficiency because it reduces $sCO_2$ viscosity and increases the viscosity difference between $sCO_2$ and water (Asafu-Adjaye et al., 2021b). Water removal is more pronounced at 90° C. than at 50° C. The mole fraction solubility of water in $sCO_2$ under these conditions is 0.023 (Asafu-Adjaye et al., 2021b), so water removal occurs at a level much higher than that is anticipated from solubility considerations alone.

Example 2

Black liquor collected from a softwood kraft mill was contacted with subcritical $CO_2$ and $sCO_2$ for various periods. Then the pressure was released, the $CO_2$ (and the water contained therein) was expelled and the (dry basis) solids content of the residual black liquor was measured. The results are provided in Table 1. A 21% increase in solids is obtained for the best case under the conditions of 90° C., 1,200 psi, and 20 minutes. This is a major accomplishment given that no evaporation is involved, and energy costs are much lower than those that would be incurred in a corresponding thermal drying process.

TABLE 1

| Dewatering black liquor with CO2 at 90° C. | | | | | |
|---|---|---|---|---|---|
| Contact time (min) | Pressure (psi) | $sCO_2$:dry solids ratio | Initial solids (%) | Final solids (%) | Increase in solids (%) |
| Subcritical | | | | | |
| 20 | 990 | 4.5 | 68.7 | 75.1 | 6.4 |
| Supercritical | | | | | |
| 2.5 | 1,200 | 4 | 60.4 | 64.2 | 3.8 |
| 5 | 1,200 | 5 | 61.8 | 67.4 | 5.6 |
| 7.5 | 1,200 | 5 | 58.6 | 70.4 | 11.8 |
| 10 | 1,200 | 5 | 58.0 | 76.2 | 18.2 |
| 20 | 1,200 | 5 | 57.8 | 79.1 | 21.3 |

A distinguishing feature of the method disclosed herein is that there is no inherent porous matrix present in black liquor as there is, for example, with coal. However, solids separate out when the pH is reduced below the $pK_a$ values of some of the phenolic groups of lignin. Bubbling $CO_2$ through black liquor for two minutes dropped the pH from 12.2 to 9.6 and deposited solids. Tomani (2010) has disclosed that reducing the pH from 11 to 9.5 raised filtered black liquor solids from 34 to 78%. Hence, the $sCO_2$ performs two functions: it first generates solids by lowering the pH thereby creating a porous matrix, which it then dewaters.

Example 3

$CO_2$-induced precipitation of lignin from black liquor has been studied extensively (Durruty, 2017; Sewring et al. 2019) for a biofuel application. The onset of precipitation is rapid, followed by agglomeration into larger particles, with the particle size increasing with time. Lignin isolated from black liquor through various means is dried, pelletized and used as biofuel in various industries. Drying is an essential component of processing the lignin.

Figure 2:
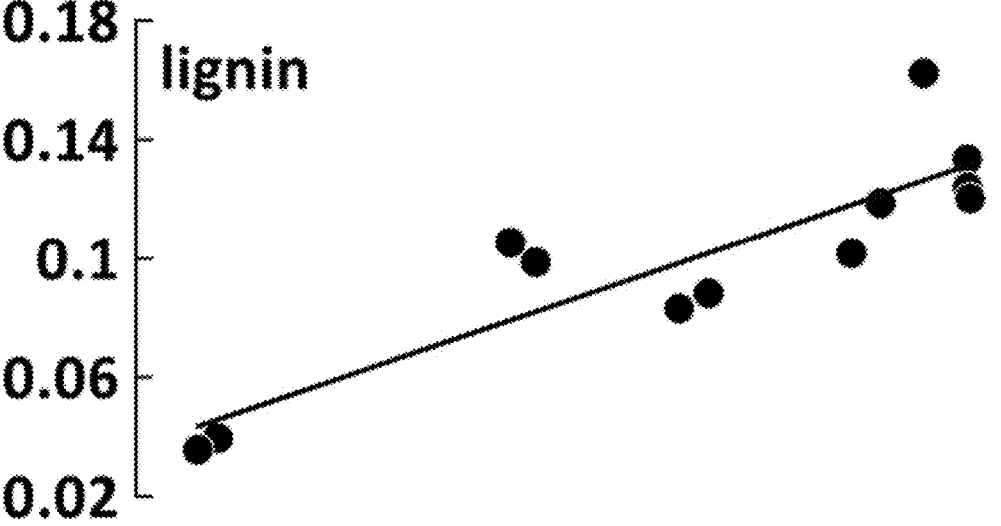
FIG. 2. Dependence of water removal on initial dry moisture content (MC) for lignin and black liquor.
Figure 2:
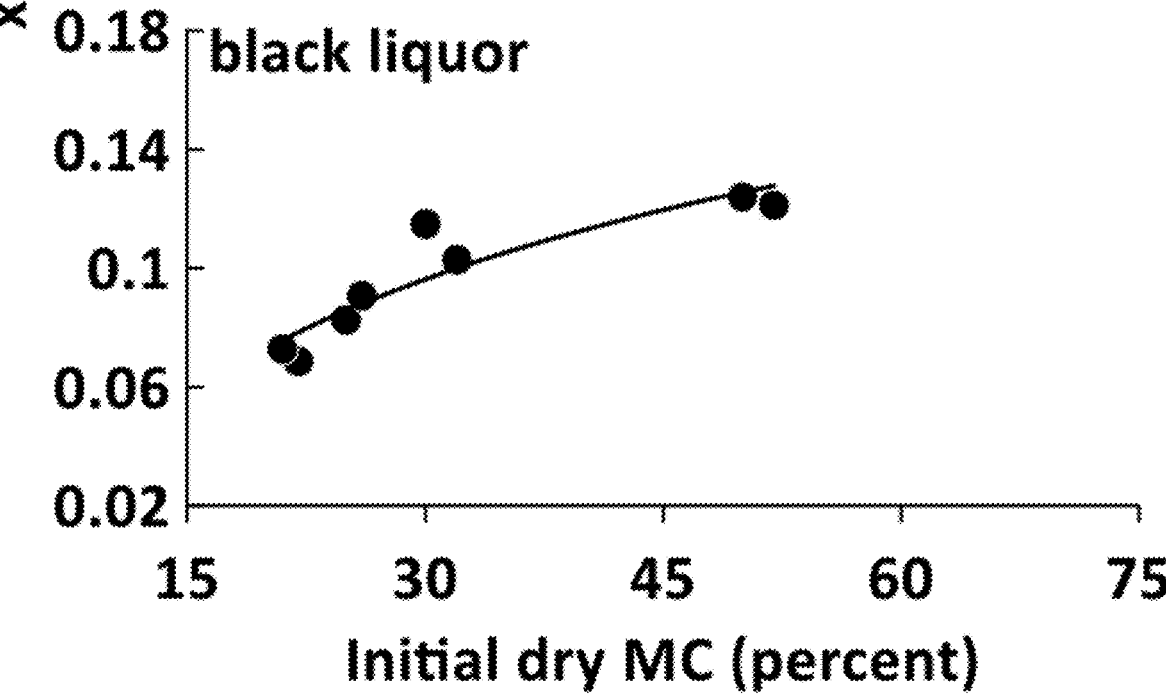

Dry alkaline kraft lignin was obtained from the Aldrich Company. Various solutions and slurries with different dry basis moisture content (MC) were prepared by adding water to the lignin and the mixtures were dewatered with $sCO_2$ at 90° C. and 1,200 psi for 20 minutes. Black liquor was also dewatered at similar solids levels. The results are provided in FIG. 2. The lignin profile is similar to the black liquor profile, demonstrating a similarity in behavior of the two viscous materials.

In previous work (Asafu-Adjaye et al., 2021a; Banerjee et al., 2020), it was found that exposing the same sample to multiple pulses of $sCO_2$ progressively increased the amount of water removed. The same effect was seen with black liquor. Treating samples (60% dry basis MC) with a second cycle of $sCO_2$ decreased x by an additional 37%.

Example 4

Figure 3:
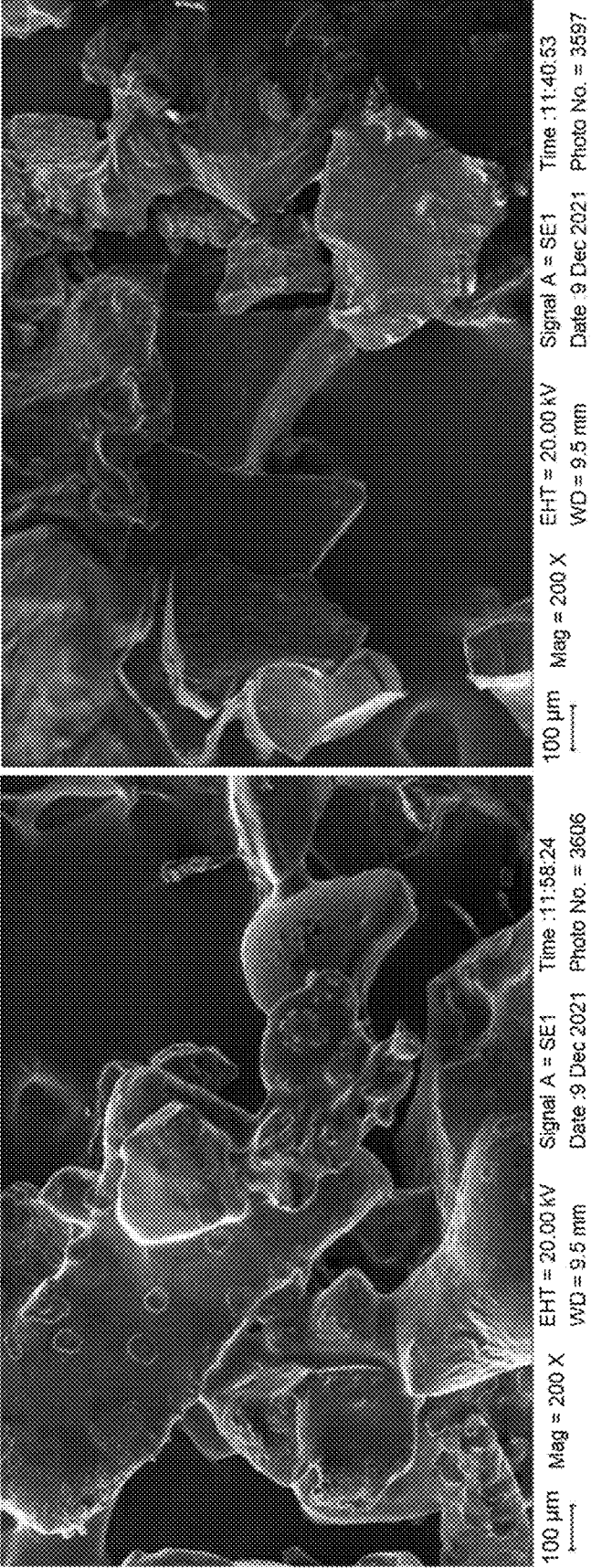
FIG. 3. Comparison of SEM images of heat-treated (left) and $sCO_2$-treated (right) black liquor samples.

Black liquor at 60% solids was oven-dried to 95% solids or $sCO_2$ dewatered over four cycles to 95% solids. Scanning electron microscopy images of the dried solids are illustrated in FIG. 3.

The oven-dried samples have a "melted" appearance, whereas the edges of the $sCO_2$-dewatered material are sharp, demonstrating a clear difference between the heat-treated and $sCO_2$ dewatered product. These differences are likely to have rheological implications.

Ohman et al. (U.S. Pat. No. 9,777,033) discloses a method for separation of lignin from black liquor. The method of Ohman requires several pH-reduction steps with intermediate addition of lignin germ particles to promote precipitation. The spontaneous nucleation of lignin particles in the acidified black liquor is specifically avoided. An intermediate washing step of the precipitated product is also required (Ohman et al., U.S. Pat. No. 8,486,224). The method disclosed herein simultaneously combines all the steps described by Ohman et al. in a single contact between $sCO_2$ and the black liquor.

A unique feature of the method of the present disclosure is that the precipitated lignin forms a cage from which water can be expressed. A problem of previous methods is that the initial deposited lignin particles are very small and require a maturation time to agglomerate into larger particles that are filterable (Kienberger et al., 2021). In the present method, the ability of the initially deposited particles to form a cage structure is different from previous methods where the chord lengths of the individual particles are 40-60 μm (Sewring et al., 2019) and are too small to form a cage.

Example 5

Figure 4:
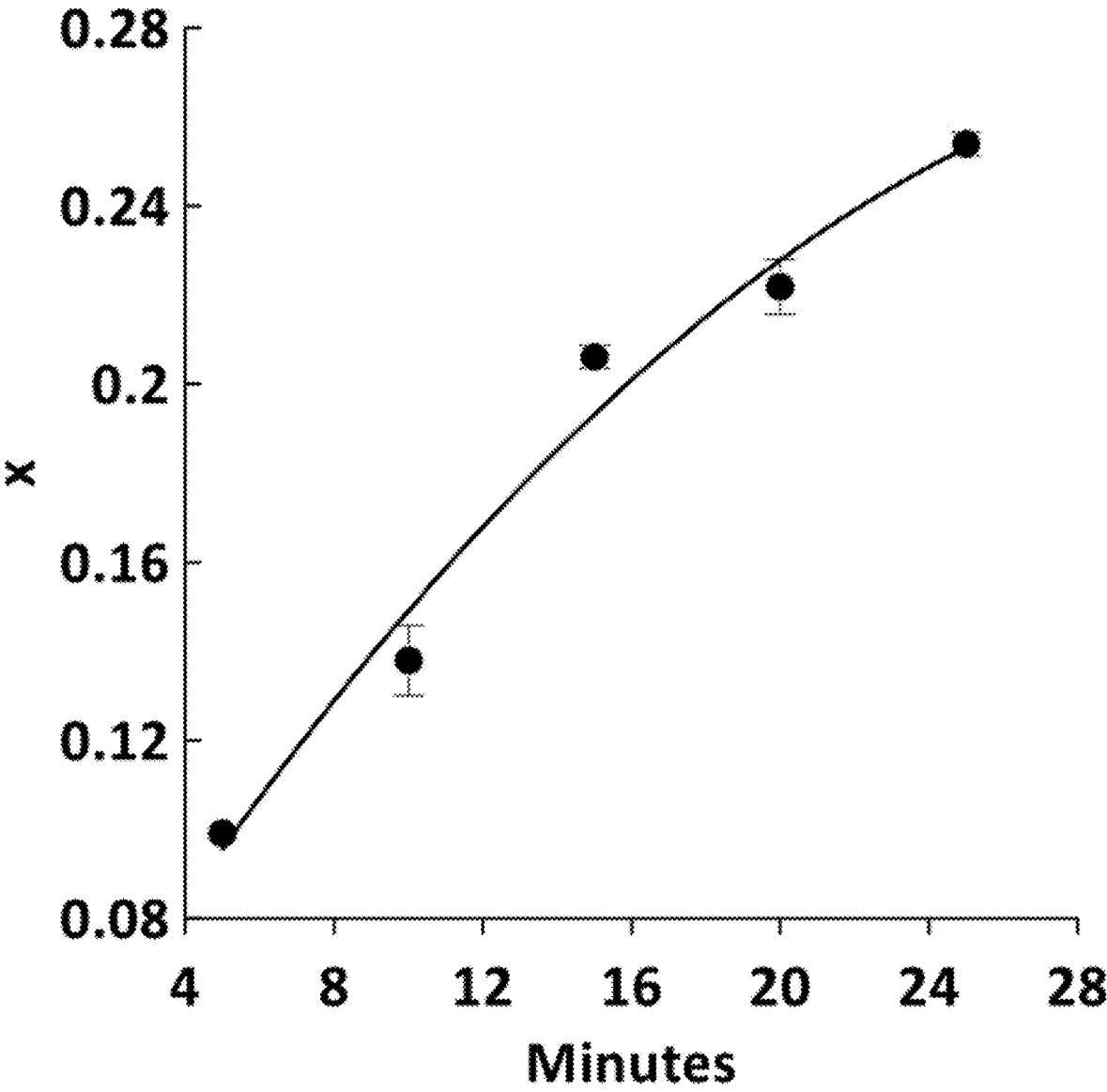
FIG. 4. Time dependence of water removal from Na-PA at 90° C. and 1,203 psi.
Figure 5:
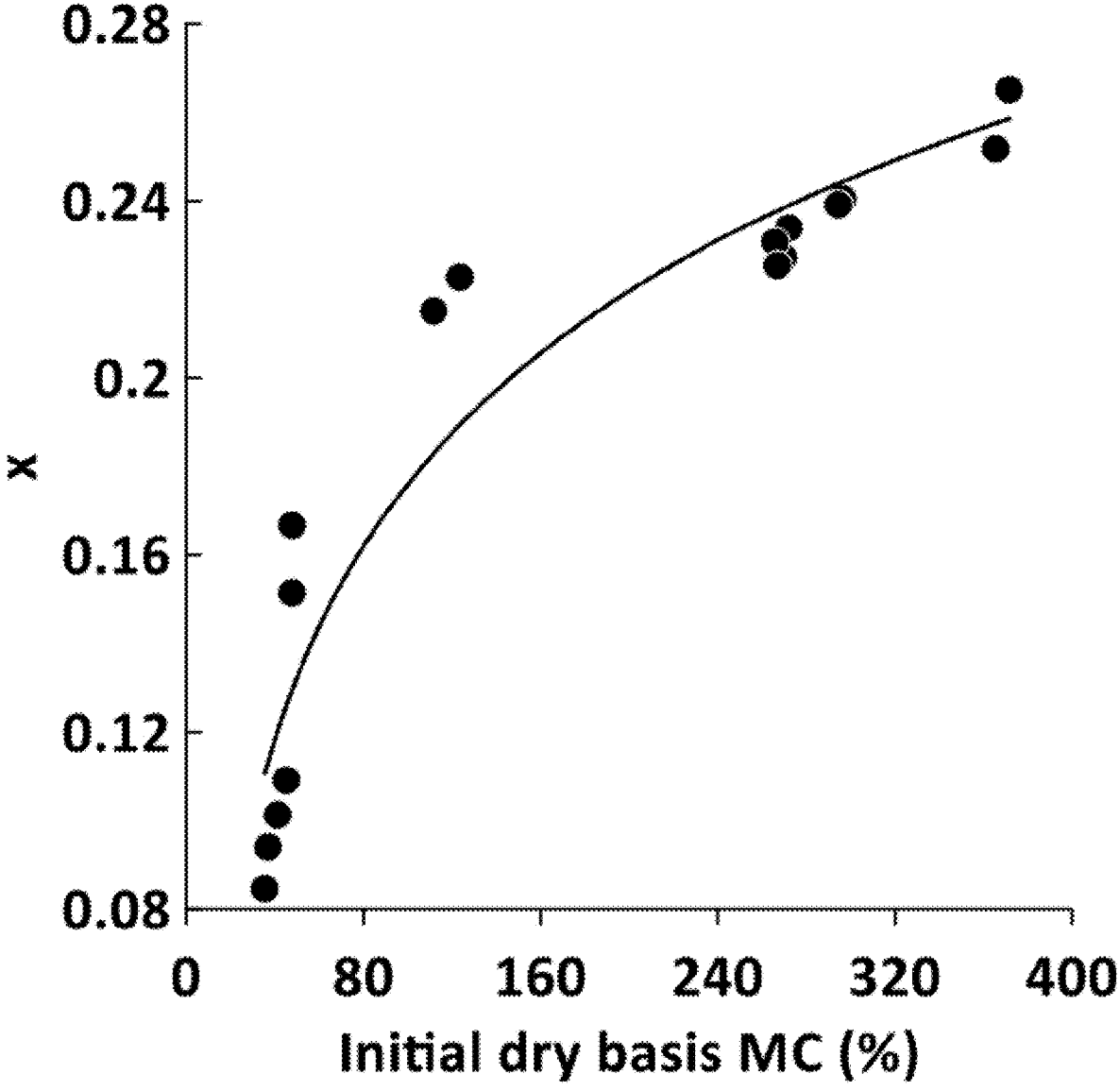
FIG. 5. Dependence of water removal from Na-PA at 90° C. and 1,203 psi on initial moisture content.
Figure 6:
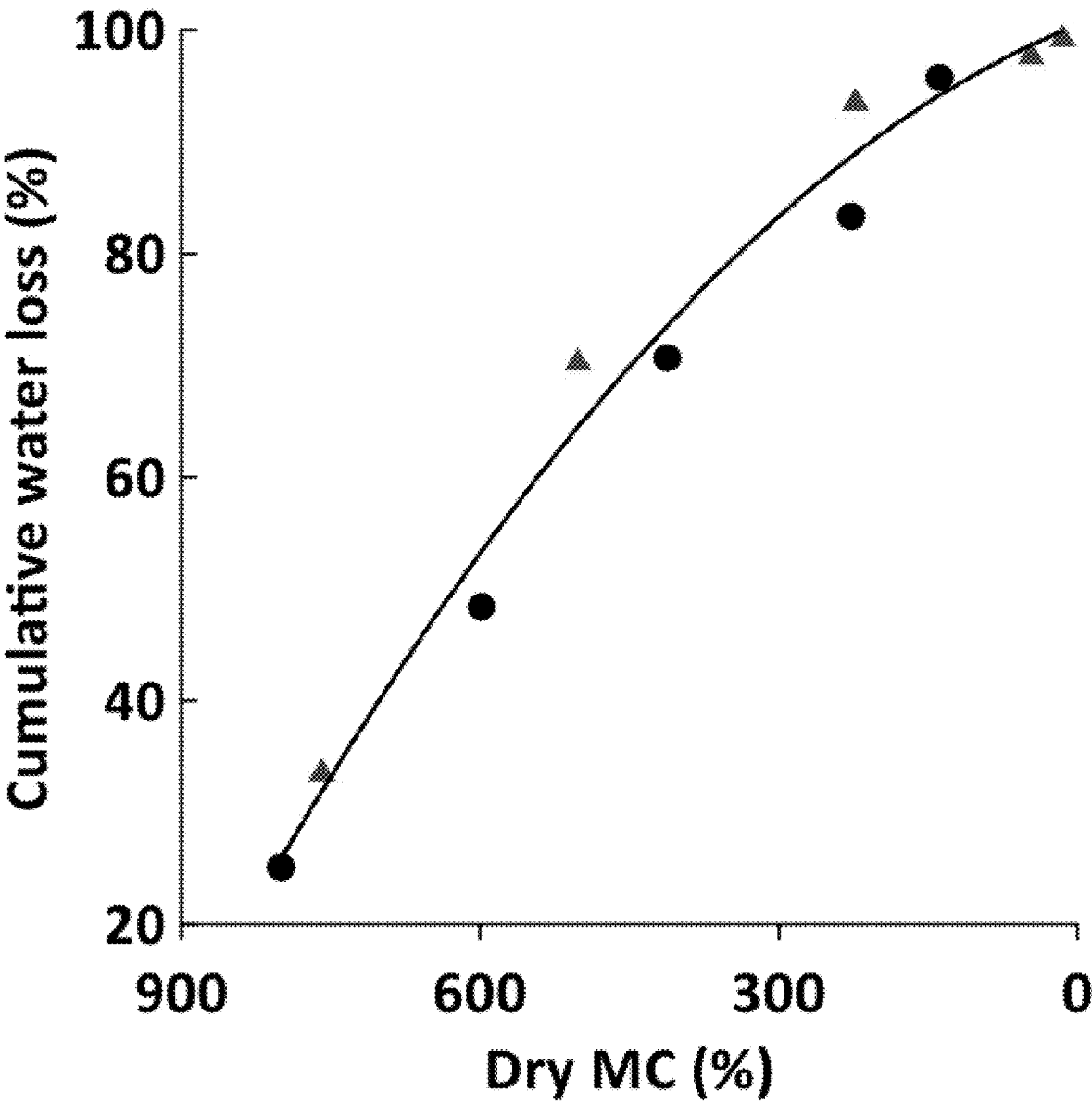
FIG. 6. Cumulative water removal from Na-PA over five cycles at 90° C. and 1,203 psi. The triangles and circles are from separate runs.

Various mixtures of Na-PA and water were dewatered by $sCO_2$ at 90° C. and 1,203 psi. The amount of water expressed over time is illustrated in FIG. 4. The water expressed over 20 minutes as a function of initial moisture content is illustrated in FIG. 5. Both plots demonstrate the ability of $sCO_2$ to remove water from Na-PA gels containing varying levels of water. The dewatering cycles can be run sequentially. The effect of running five sequential cycles is shown in FIG. 6, where the large amount of water held by Na-PA can be almost completely removed by $sCO_2$.

Example 6

A mixture of sucrose and water was dewatered by $sCO_2$ at 90° C. and 1,203 psi for 20 minutes. The initial solids content of 41% was increased to 55% during exposure to $sCO_2$. The viscosity of a 55% solution of sucrose is 22 cP at 25° C. (Swindells et al., 1958). Dewatering over three consecutive cycles dried the sucrose to a glassy solid with no trace of color. The lack of color contrasts with and is an advantage over thermal drying where the sucrose solution began to develop a yellow color after heating to 104° C. for 5 minutes.

REFERENCES

Asafu-Adjaye, Via, B., Sastri B., Banerjee, S. Displacement dewatering of sludge with supercritical $CO_2$. Water Res. 190, 116764, 2021a.

Asafu-Adjaye, Via, B., Sastri, B., Banerjee, S., Mechanism of dewatering porous structures with supercritical carbon dioxide. Case Stud. Chem. Environ. Eng., 4, 100128, 2021b.

Aggarwal, S., Johnson, S., Hakovirta, M., Sastri, B., Banerjee, S. Removal of water and extractives from softwood with supercritical carbon dioxide. Ind. Eng. Chem. Res. 58, 3170-3174, 2019.

Banerjee, S., Sastri, B., Aggarwal, S., Hakovirta, M. Dewatering coal with supercritical carbon dioxide. Int. J. Coal Prep. Util. 42 (5), 1393 (2020).

Bispo, J. A. C., Bonafe, C. F. S., Santana, K. M. O. V., Santos, E. C. A. A comparison of drying kinetics based on the degree of hydration and moisture ratio. Food Sci. Technol. 60, 192-198, 2015.

Brown, Z. K., Fryer, P. J., Norton, I. T., Bakalis, S., Bridson, R. H. Drying of foods using supercritical carbon dioxide-investigations with carrot. Innov. Food Sci. Emerg. Technol. 9, 280-289, 2018.

Clay principles and black liquor properties. D. T. Evaporator tappi.org/content/events/08kros/manuscripts/3-1.pdf.

Durruty J. On the local filtration properties of LignoBoost lignin. PhD dissertation. Chalmers University of Technology, Gothenburg, Sweden. 2017.

Franich, R. A., Gallagher, S., Kroese, H. Dewatering green sapwood using carbon dioxide cycled between supercritical fluid and gas phase. J. Supercrit. Fluids 89, 113-118, 2014.

Franich, R. A, Meder, R., Falge, M., Fuchs, J., Behr, V. C. Uncovering supercritical $CO_2$ wood dewatering via interleaved 1H-imaging and 13C-spectroscopy with real-time reconstruction. J. Supercrit. Fluids. 144, 56-62, 2019.

Kienberger, M., Maitz, S., Pichler, T., Demmelmayer, P. Systematic review on isolation processes for technical lignin. Processes 2021, 9 (5), 804.

Montesantos, N., Nielsen, R. P., Maschietti, M. Upgrading of nondewatered nondemetallized lignocellulosic biocrude from hydrothermal liquefaction using supercritical carbon dioxide. Ind. Eng. Chem. Res. 59, 6141-6153, 2020.

Ohman et al., U.S. Pat. No. 9,777,033.

Ohman et al., U.S. Pat. No. 8,486,224.

Ohman et al., U.S. Pat. No. 9,382,389.

Sewring T, Durruty J, Schneider L, Schneider H, Mattsson T, Theliander H. Acid precipitation of kraft lignin from aqueous solutions: the influence of pH, temperature, and xylan. J Wood Chem Technol 3, 1-13, 2019.

Swindells, J. F., Snyder, C. F., Hardy, R. C., Golden, P. E., Viscosities of sucrose solutions at various temperatures: Tables of recalculated values. Supplement to National Bureau of Standards Circular 440 Issued Jul. 31, 1958.

Tomani, P., The Lignoboost process. Cellulose Chem. Technol., 44 (1-3), 53-58, 2010.

Wu, C. C., Raghavan S., Pine, A., Alfaro, J, Love, B. J., Collias, D. I. Dewatering of super absorbent polymers: Alternatives to thermal desorption by liquid phase extraction using dimethyl ether. Resour Conserv Recycl. 171. 2021.

Zekry, M., Nassar, I., Salim, H., Abdallah, A. The potential of super absorbent polymers from diaper wastes to enhance water retention properties of the soil. Soil Environ. 39(1): 27-37, 2020.

What is claimed is:

1. A method of dewatering a viscous material, comprising:

i) contacting the viscous material with pressurized carbon dioxide at a temperature and for a time wherein at least a fraction of water is expressed from the viscous material; and ii) releasing the pressure and removing the water expressed from the viscous material to yield a dewatered product.

2. The method of claim 1, wherein the fraction of water expressed from the viscous material exceeds the solubility of water in the pressurized carbon dioxide.

3. The method of claim 1, wherein the viscous material has a viscosity of between about 2 and about 30,000 centipoise.

4. The method of claim 1, comprising contacting the viscous material with the pressurized carbon dioxide for between about 10 milliseconds and about 3 hours.

5. The method of claim 1, wherein the carbon dioxide is present in supercritical form.

6. The method of claim 5, wherein the temperature of the carbon dioxide is between about 31° C. and about 200° C.

7. The method of claim 5, wherein the pressure of the carbon dioxide is between about 1,080 psi and about 4,000 psi.

8. The method of claim 1, wherein the carbon dioxide is present in subcritical form.

9. The method of claim 1, wherein the viscous material has a solids content of between about 0.01% and about 95%.

10. The method of claim 1, wherein the viscous material is black liquor from a wood pulping operation.

11. The method of claim 10, wherein the black liquor has a solids content of between about 10% and about 95%.

12. The method of claim 10, wherein the viscous material is softwood black liquor.

13. The method of claim 10, wherein the viscous material is hardwood black liquor.

14. The method of claim 1, wherein the viscous material is wet lignin.

15. The method of claim 14, wherein the wet lignin has a solids content of between about 10% and about 95%.

16. The method of claim 1, wherein the viscous material is a mixture of a superabsorbent polymer and water.

17. The method of claim 16, wherein the superabsorbent polymer is sodium polyacrylate.

18. The method of claim 1, wherein the viscous material is a mixture of a carbohydrate and water.

19. The method of claim 18, wherein the mixture of a carbohydrate and water has a solids content of between about 10% and about 95%.

20. The method of claim 18, wherein the carbohydrate is a sugar.

21. The method of claim 1, wherein the carbon dioxide interacts with components of the viscous material to increase solid contents of the viscous material.

22. The method of claim 21, wherein the viscous material is black liquor from a wood pulping operation.

23. The method of claim 21 wherein the viscous material is wet lignin.

\* \* \* \* \*